(12) United States Patent
Yim et al.

(10) Patent No.: US 8,155,044 B2
(45) Date of Patent: Apr. 10, 2012

(54) METHOD FOR BROADCASTING ALERT MESSAGE IN MOBILE MULTI-HOP NETWORKS USING INFERRED DISTANCE PRIORITIZATION

(75) Inventors: Raymond Yim, Cambridge, MA (US); Jianlin Guo, Malden, MA (US); Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 499 days.

(21) Appl. No.: 12/357,157

(22) Filed: Jan. 21, 2009

(65) Prior Publication Data

US 2010/0182982 A1    Jul. 22, 2010

(51) Int. Cl.
*H04H 20/71* (2008.01)
(52) U.S. Cl. ....................................................... 370/312
(58) Field of Classification Search ........... 370/310–350
See application file for complete search history.

(56) References Cited

U.S. PATENT DOCUMENTS

| | | | | |
|---|---|---|---|---|
| 6,804,237 B1 * | 10/2004 | Luo et al. | ...................... | 370/392 |
| 2005/0254471 A1 * | 11/2005 | Zhang et al. | .................. | 370/338 |
| 2006/0029074 A2 * | 2/2006 | Bauer | ............................ | 370/390 |
| 2007/0121521 A1 * | 5/2007 | D'Amico et al. | ............. | 370/252 |
| 2007/0244614 A1 * | 10/2007 | Nathanson | ....................... | 701/35 |
| 2007/0280187 A1 * | 12/2007 | Wang et al. | .................... | 370/338 |
| 2009/0122738 A1 * | 5/2009 | Chen et al. | ..................... | 370/312 |
| 2011/0019608 A1 * | 1/2011 | Dohler et al. | ................. | 370/315 |

OTHER PUBLICATIONS

Mangharam et al., "Bounded-Latency Alerts in Vehicular Networks," Proc. IEEE Mobile Networking for Veh. Env., May 2007.
Nekovee et al., "Reliable and Efficient Information Dissemination in Intermittently Connected Vehicular Adhoc Networks," Proc. IEEE Veh. Tech. Conf., Apr. 2007.

* cited by examiner

*Primary Examiner* — Kwang B Yao
*Assistant Examiner* — Kenan Cehic
(74) *Attorney, Agent, or Firm* — Dirk Brinkman; Gene Vinokur

(57) ABSTRACT

A method and system broadcasts an alert packet in a wireless multi-hop network of nodes. An event is sensed in a source node of the network, and an alert packet is broadcast in response to sensing the event. The alert packet is received in a set of candidate nodes within a broadcast range of the source node. Each candidate node infers a distance between the candidate node and the source node based on a receive power of the received alert packet, and determines a priority for rebroadcasting the alert packet, wherein the priority is based on the distance to minimizing a probability of collisions while rebroadcasting the alert packet and extend a range of the rebroadcasting.

20 Claims, 12 Drawing Sheets

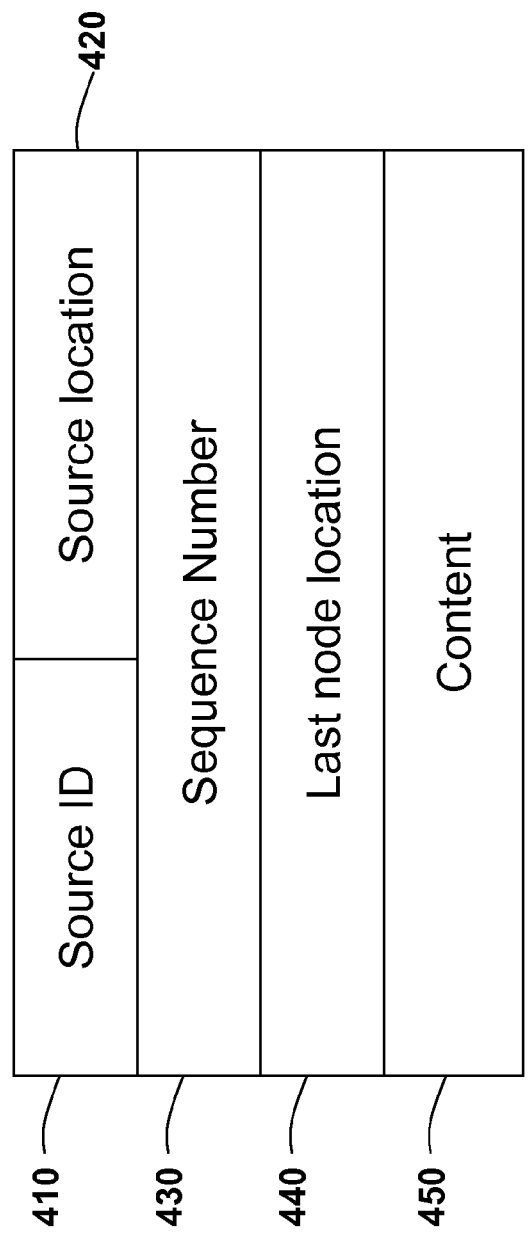

500

| Probability Matrix | $b_1$ | $b_2$ | ... | $b_n$ |
|---|---|---|---|---|
| Inferred Location Index  i = 1 | $p_{11}$ | $p_{12}$ | ... | $p_{1n}$ |
| i = 2 | $p_{21}$ | $p_{22}$ | ... | $p_{2n}$ |
| ... | ... | ... | ... | ... |
| i = m | $p_{m1}$ | $p_{m2}$ | ... | $p_{mn}$ |
| Sum of column | m/n | m/n | | m/n | back-off time

Condition for minimum collision

*Fig. 7*

METHOD FOR BROADCASTING ALERT MESSAGE IN MOBILE MULTI-HOP NETWORKS USING INFERRED DISTANCE PRIORITIZATION

FIELD OF THE INVENTION

This invention relates generally to wireless multi-hop broadcast networks, and more particularly to broadcasting alert packets in a multi-hop broadcast network using information implying distance in contention control.

BACKGROUND OF THE INVENTION

A wireless ad hoc network of nodes can disseminate critical safety information in alert packets. The nodes can be embedded in vehicles. The alert can be used to trigger emergency response resources. For example, the network can signal unusual events, such as accidents, disabled vehicles, or road obstructions to operators in nearby vehicles. When the vehicles are equipped with the wireless nodes, the information can easily be broadcast and propagated along the road.

Location-based multiple access is described by Mangharam et al., "Bounded-Latency Alerts in Vehicular Networks," Proc. IEEE Mobile Networking for Veh. Env., May 2007. That network uses a priori scheduling based on historical trends in an urban partitioned into city blocks, Vehicles in a specific block broadcast during predetermined time slots. That reduces the probability of multiple access contention for the alert packets.

In the IEEE 802.11 standard, a random back-off time is chosen from a uniform probability distribution function, which does not depend on the location of the nodes or any other properties that a node may possess. While this method can minimize the probability of packet collision, it does not help to speed up the expansion of coverage area. Also, the lack of distance-based prioritization also makes broadcast flooding control difficult.

Edge-aware epidemic protocols are described by Nekovee et al., "Reliable and Efficient Information Dissemination in Intermittently Connected Vehicular Adhoc Networks," Proc. IEEE Veh. Tech. Conf., April 2007. A maximum back-off time is exponentially biased towards vehicles that are further away from the source of information. Specifically, the maximum back-off time is adjusted so that the back-off time is shorter for distant nodes. Then, the actual back-off time is selected randomly from a uniform distribution in the interval [0, maximum back-off time].

The maximum back-off time can also be exponentially biased towards nodes that receive a similar proportion of forward and backward packets, where forward packets denotes packets going away from the source, and backward packets denotes packets going towards the source. Using the uniform distribution for selecting the actual back-off number is suboptimal.

SUMMARY OF THE INVENTION

The embodiments of the invention provide a method and system for minimizing a probability of collisions during rebroadcasting of an alert packet in a wireless multi-hop broadcast network of nodes. The method assigns a priority to nodes according to a distance, or information that implies a distance, between a source node and a receiving node, i.e., the larger the distance the higher the priority. A node with a higher priority rebroadcasts the packet before a node with a lower priority. If a particular node determines that another node with a higher priority has already rebroadcast the packet, the node does not rebroadcast, thereby reducing the probability of collisions.

In one embodiment the method uses a global positioning system (GPS) to determine the distances. Another embodiment uses a received signal strength indication (RSSI). Beacon signals can also be used. The RSSI is a measurement of power in a received radio signal, which is generally inversely proportional to some power of the distance.

The idea of the invention is that if the node that is the furthest from the source node transmits first, the coverage area is expanded as quickly as possible, and packet collisions are minimized.

BRIEF DESCRIPTION OF THE DRAWINGS

FIG. 4A is a block diagram of an alert packet with broadcast contention control using GPS signals;

FIG. 7 is a table denoting the probability of rebroadcasting the alert packet at a certain back-off time given the inferred location of a node relative to the source of the alert packet.

DETAILED DESCRIPTION OF THE PREFERRED EMBODIMENT

Prioritized Broadcast Contention Control

The embodiments of the invention provide a method and system for minimizing a probability of collisions while rebroadcasting an alert packet initially broadcast by a source node in a wireless multi-hop network of nodes.

When the alert packet is broadcast, each receiving node determines whether the packet should be rebroadcast or not. The receiving node only rebroadcasts the first received copy of the packet. As defined herein, a receiving node successfully decodes a packet. The node first determines a distance to the source node based on location information or received signal strength. Then, the node selects a back-off time from an optimal distribution. The optimal distribution minimizes the probability of collision during rebroadcast, and gives a higher priority to nodes farther away from the source, i.e., these nodes rebroadcast at an earlier time.

In one embodiment, a global positioning system is used to determine the absolute locations of the nodes. The absolute location of the source or relay node is stored in the packet. The actual locations can then be used to determine the absolute distances between the nodes.

In another embodiment, a received signal strength indicator (RSSI) is used to determine relative locations. For a particular received signal power, the receiving nodes packet can infer the relative distances to the source node.

Figure 1A:
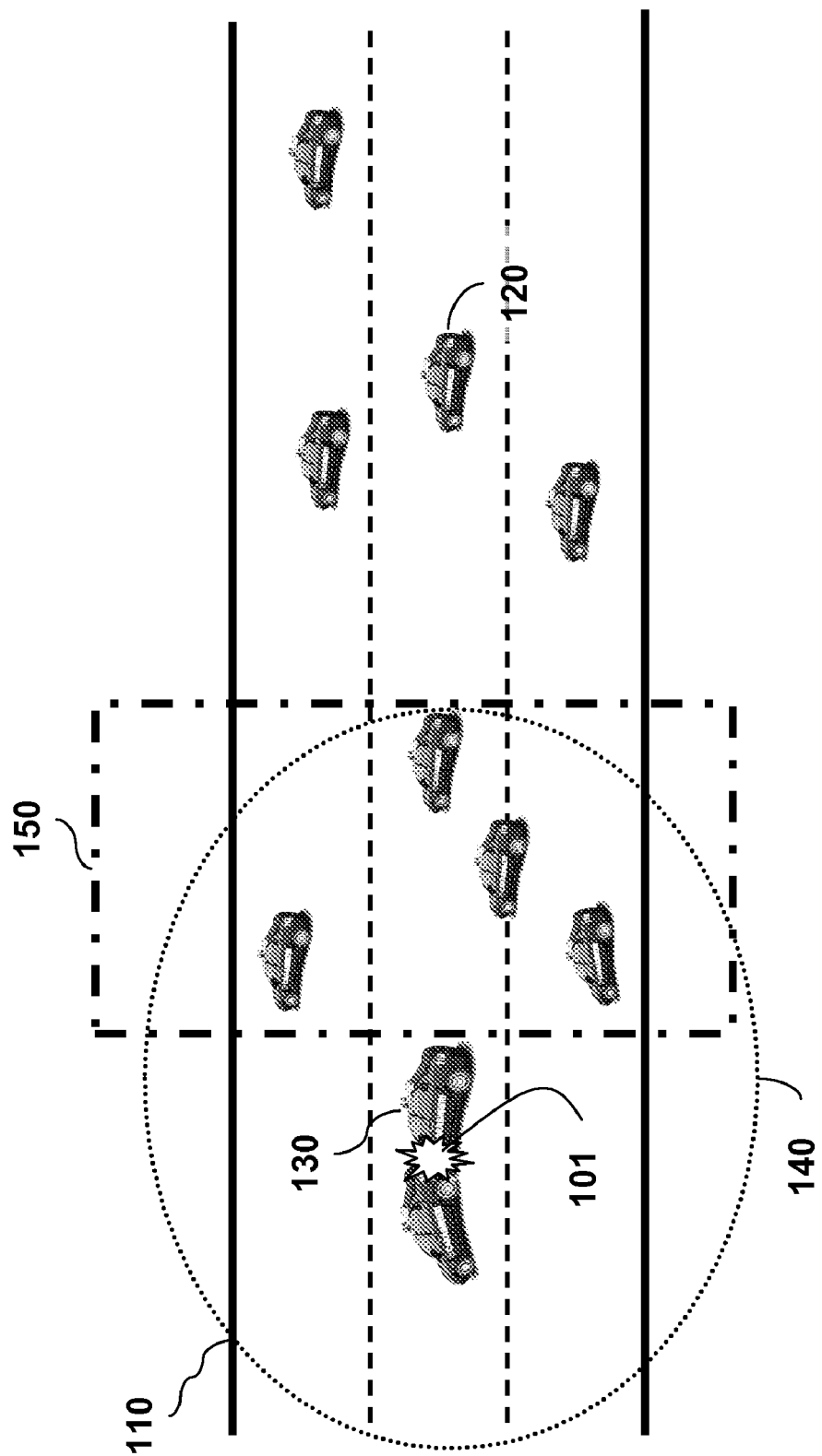
FIG. 1A is a schematic of broadcasting an alert packet from a source in a network according to embodiments of the invention.

FIG. 1A shows a section of a road 110 including vehicles, 120. Each vehicle includes a node (transceiver). As can be seen two vehicles are subject to an event 101, which causes one of the vehicles to broadcast an alert packet. Herein, the terms vehicle and node are used interchangeably. Node 130 is the source for broadcasting the alert packet. The packet is received by all vehicles with the broadcast range 140. The nodes in the vehicles in the area 150 are a candidate set that are required to rebroadcast the packet so that the packet can be propagated along the road. However, the rebroadcasting can cause collisions and network congestion.

Figure 1B:
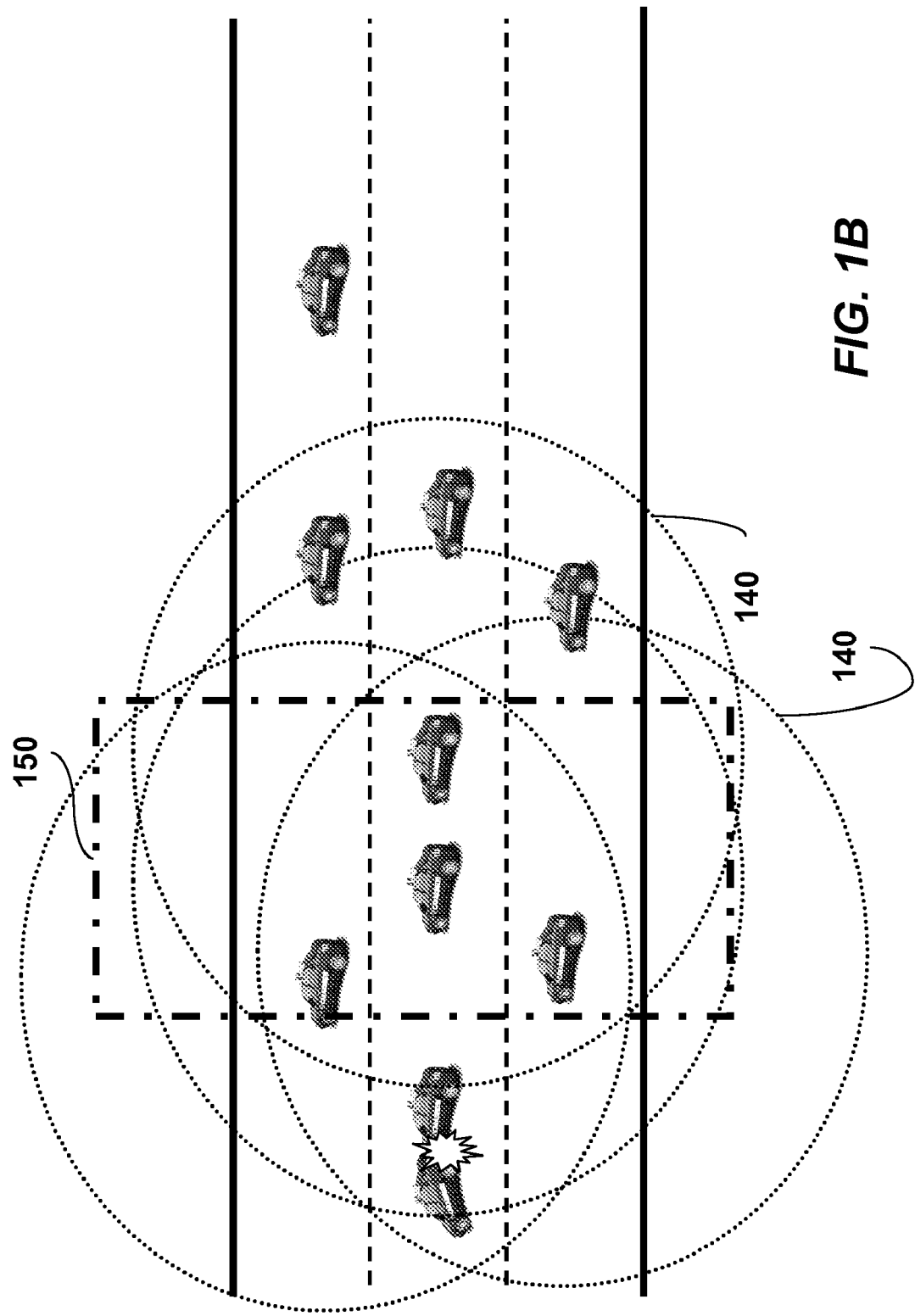
FIG. 1B is a schematic of rebroadcasting the packet according to embodiments of the invention.

FIG. 1B shows the broadcast range 140 for each vehicle in the candidate set 150. Under conventional carrier sense multiple collision (CSMA) operation, the vehicles in the set, 140 have overlapping broadcast ranges. Thus, collisions are possible if all nodes rebroadcast with a similar back-off times. If the number of vehicles on the road is large, the rebroadcasting quickly cause packet congestion and delay due to excessive waiting for the broadcast channel to become idle.

All nodes perform random back-off before rebroadcasting. The IEEE 802.11p and IEEE P1609 standards provide wireless access in a vehicular environment (WAVE). These standards specify the CSMA for packet exchange on a common channel. Each vehicle that has received the packet first waits a random period of time and then senses the channel to confirm that is free of other packets. If this is true, then the vehicle can transmit, otherwise the vehicles wait for another random period before resensing the channel.

Figure 2A:
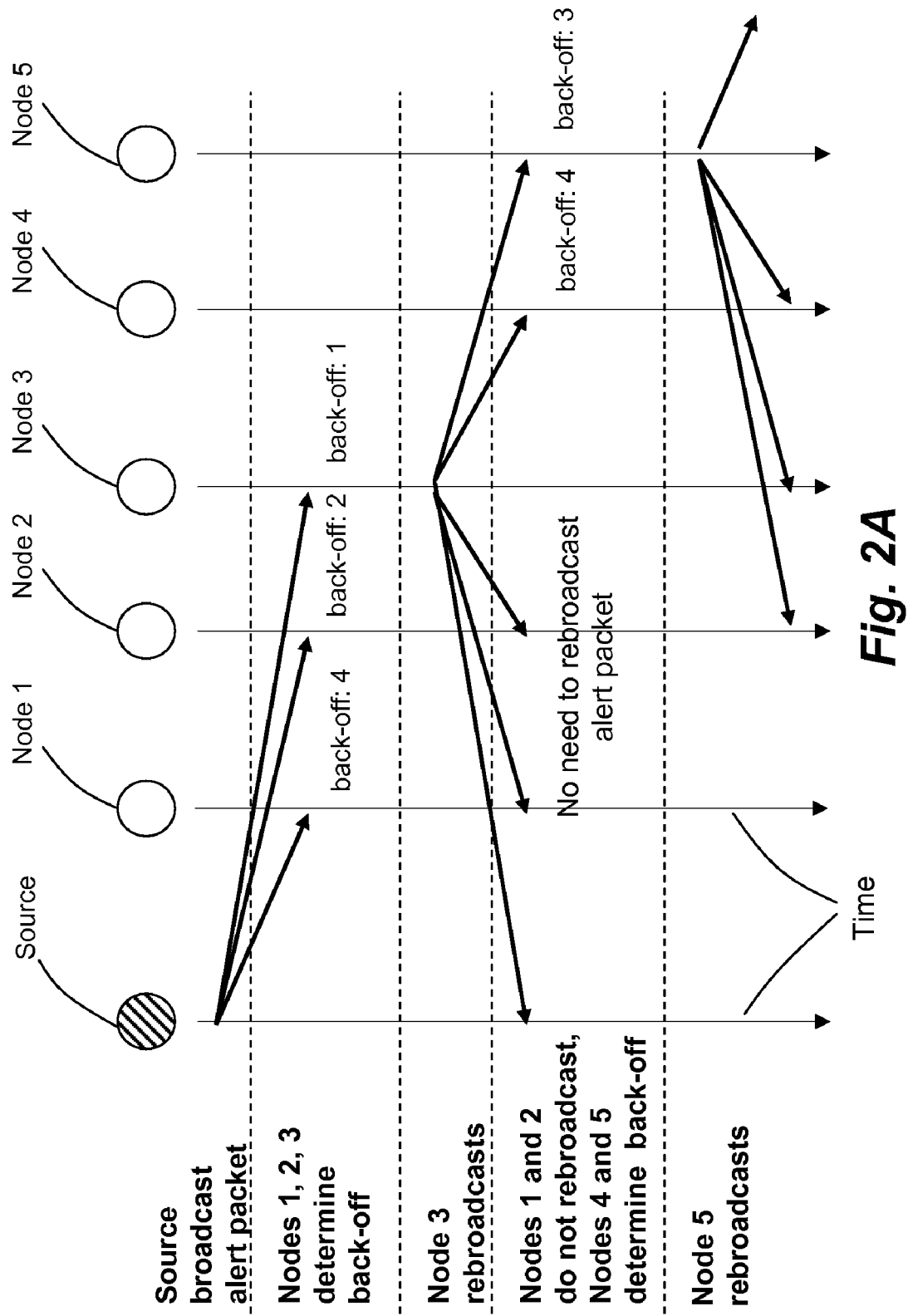
FIG. 2A is timing diagram of distance-based broadcast contention control without collisions.
Figure 2B:
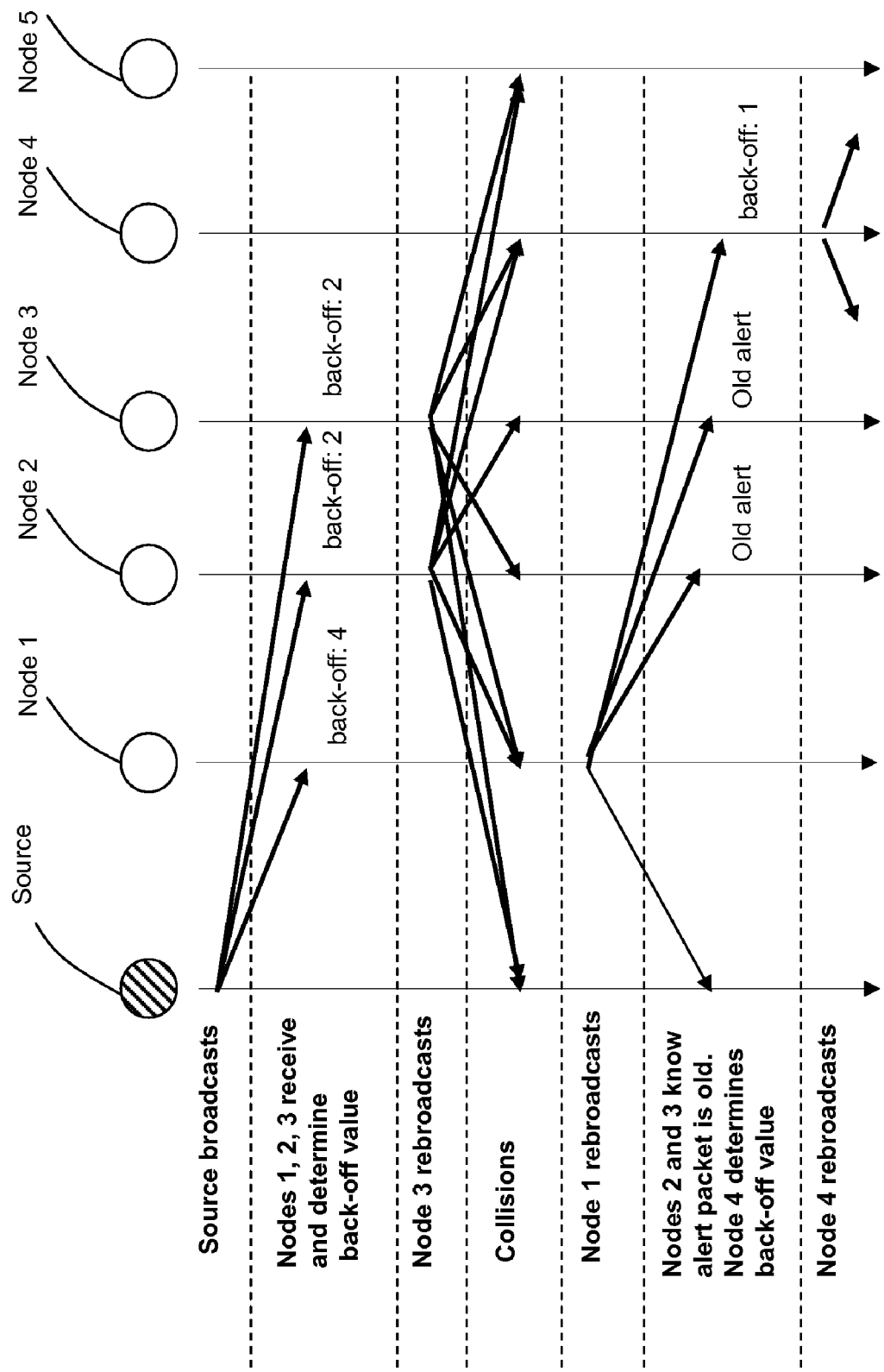
FIG. 2B is a timing diagram of distance-based broadcast contention control with collisions.

FIGS. 2A and 2B show distance-based broadcast contention control in a multihop broadcast network using either absolute or relative distances. In FIG. 2A, the source broadcasts the packet using a predetermined broadcast power. The alert packet is received by nodes 1, 2 and 3. Nodes 4 and 5 are out of the broadcast range.

Nodes 1, 2 and 3 determine respective back-off values. In this example, node 3 in the candidate set is the furthest away from the source. Node 3 selects a back-off value of 1, which is the smallest value compared to the values selected by nodes 1 and 2. Hence, node 3 rebroadcasts the alert packet first after waiting for the time duration associated with its back-off value. When nodes 1 and 2 receive the alert packet broadcast by node 3, these determine the alert packet has already been rebroadcasted by a node that is further away from the source. Hence, nodes 1 and 2 no longer rebroadcast to minimize the collisions and decrease bandwidth. Nodes 4 and 5 receive the packet form node 3, and similarly determine respective back-off values.

In the example in FIG. 2B, nodes 1, 2 and 3 receive the alert packet from the source. Nodes 2 and 3 both select a back-off value of 2. As a result, a collision occurs when both nodes rebroadcast the alert packet. While nodes 2 and 3 broadcast, node 1 suspends its back-off timer, and waits for the broadcast to end and the channel becomes free. After the broadcast ends, node 1 has not received the packet. Hence, node 1 resumes decrementing its back-off timer, and then rebroadcasts the alert packet when the timer expires. Both nodes 2 and 3 discard the packet from node 1, because they have previously received the packet. However, node 4 receives the alert packet for the first time, and rebroadcasts the packet after some back-off time.

Both examples show some fundamental techniques to achieve prioritized broadcast contention control based on inferred distance. When a node receives the alert packet, the node first estimates an inferred distance to the broadcasting node in a distributed manner, using either or some combination of the two methods (e.g., maximum, weighted average, or minimum values given by the two methods). Based on the inferred distance, the node selects a back-off value using a probability distribution function (pdf). The pdf gives a higher priority to nodes farther from the broadcaster, in other words the pdf is non-uniform. It is noted that the priority can be independent on a maximum distance or range of the broadcasting signal.

State Machine

Figure 3:
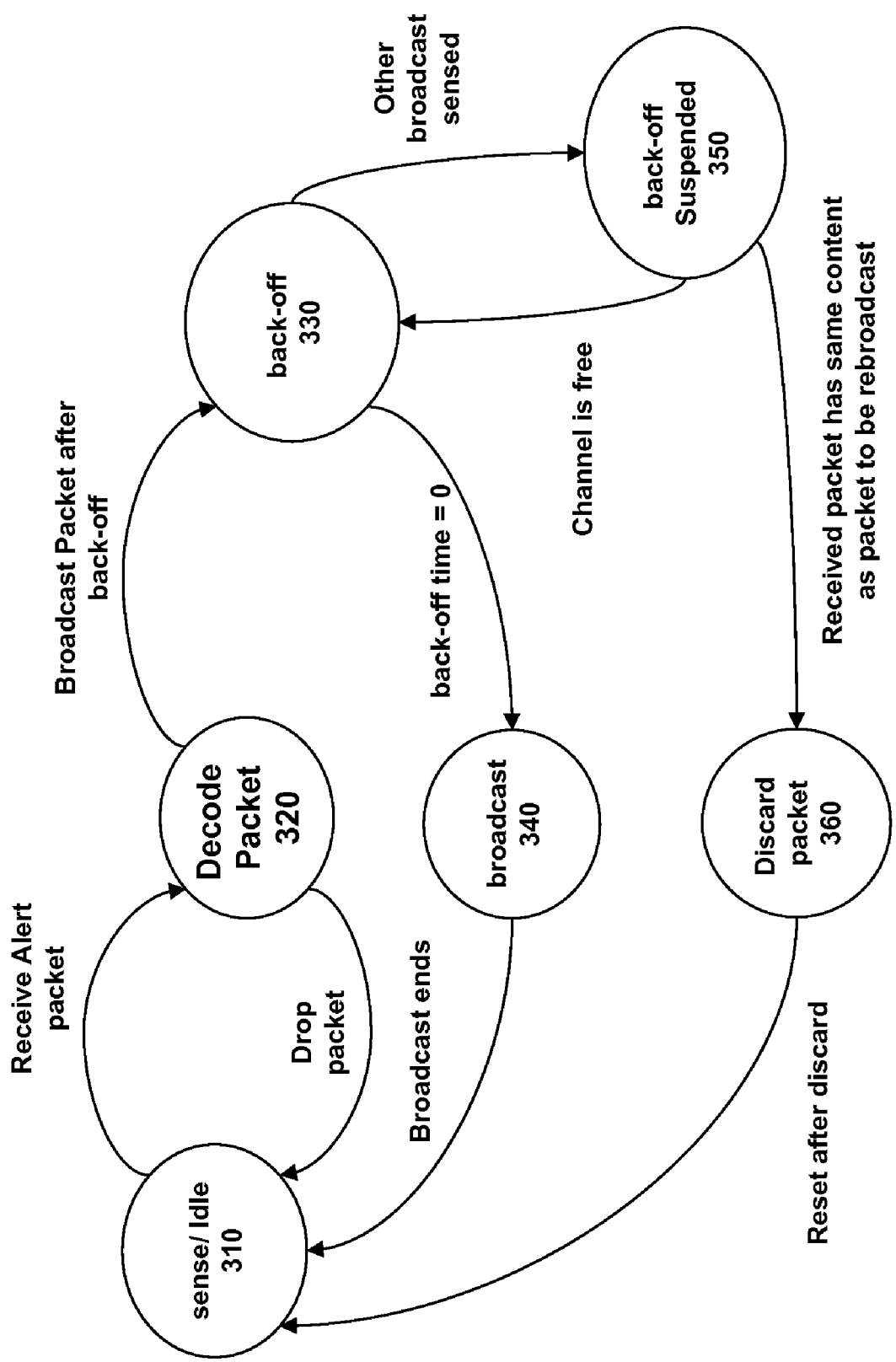
FIG. 3 is a state diagram of a rebroadcasting process.

FIG. 3 shows a state machine for the method according to embodiments of the invention. When a node receives an alert packet, the node transitions from a sense/idle state 310 to decode packet state 320. If the node determines that the packet does not need to be rebroadcast, then the node transitions back to the sense sense/idle state. Otherwise, the node rebroadcasts the packet using a specific back-off time. Then, the node transitions to the back-off state 330, and starts decrementing the back-off time until it reaches zero, at which time the node rebroadcasts 340 the packet, and transitions to the sense/idle state.

While the back-off time is decrementing, other nodes may broadcast the packet and the channel is not free, and the node senses the broadcast. In this case, the node transition from the back-off state to back-off suspended state 350, and attempts to decode the packet. In the back-off suspended state, the back-off value does not change.

If the packet is successfully decoded and the content of the packet is the same as the previously received alert message, the packet to be sent by the node, the node discards 360 the packet, and transitions to the sense/idle state without broadcasting the packet. Otherwise, after the channel is free again, the node re-enters the back-off state and decrements the back-off timer.

In the above case, where the node discards 360 the packet, it is possible that some other nodes may rely on this node to rebroadcast so that the other nodes can receive the alert message. This case occurs when a node is only within the coverage area of the node that discards the message. Thus, there is a trade-off between efficiency (time for alert message propagation), and reliability (delivering the message to all nodes). Then, it may be reasonable to allow nodes to rebroadcast alert messages even if they receive another node rebroadcast. Specifically, the transition from state 350 to 360 can be omitted from FIG. 3, and the transition from 350 to 330 always occurs when the channel becomes free.

Method Based on GPS Position

FIG. 4A shows the content of the alert packet based on GPS position system 400. The content includes the node ID 410, the node location 420, a sequence number 430, a location 440 of the last node, and content 450. The source ID and sequence number are used to determine if the alert packet has been already received. The last node is described below. The locations of the source and last nodes are the same if the packet is broadcast by the source node. It should be noted that other positioning systems can be used such as systems that use beacons.

Figure 4B:
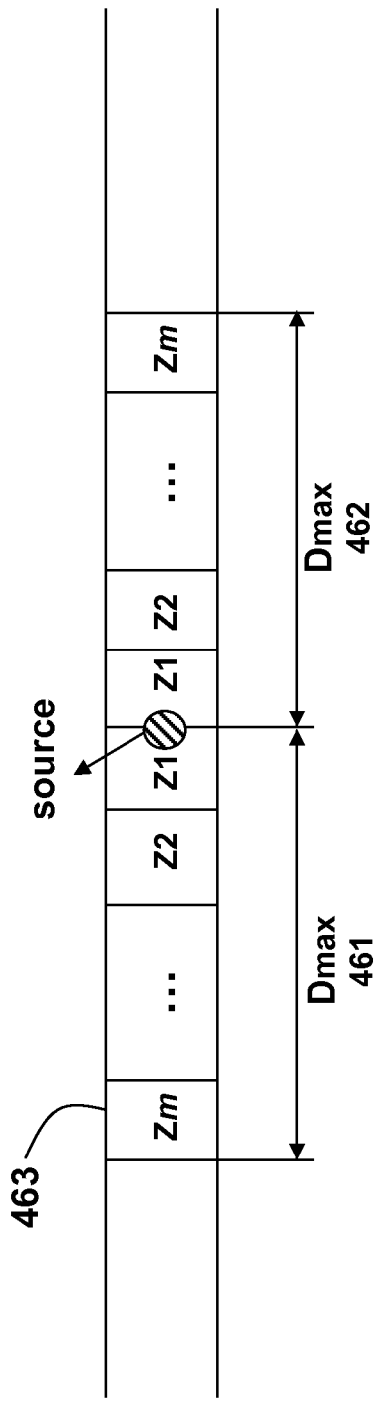
FIG. 4B is a block diagram of an inferred area of using distance information.

As shown in FIG. 4B, we partition into two rebroadcast areas 461-462. Each area is partitioned into m different zones 463 according to the distance to the last node, where m is an integer greater than 1. In the embodiment, we assume that the propagation mechanism is the same in both rebroadcast areas 461 and 462. Additional filtering and probabilistic biasing mechanism can be used if the system decides to favor dissemination of information in only one of the two areas.

The areas are as $Z_1, Z_2, \ldots, Z_m$, with $Z_1$ the closest to last node, and $Z_m$ the farthest from last node. With given broadcast power $P_{Tx}$, the maximum broadcast range R of the source node is $$R = POW\left(\frac{P_{Tx} - RSSI_{th}}{10\alpha}\right),$$

where $POW(x)=10^x$, and $RSSI_{th}$ is the sensitivity of the receiver. Each zone covers R/m meters if the areas are uniformly partitioned. For example, an index i can be computed using $$i = \left\lceil \frac{\sqrt{(Long_{Rx} - Long_{Tx})^2 + (Lat_{Rx} - Lat_{Tx})^2}}{POW\left(\frac{P_{Tx} - RSSI_{th}}{10\alpha}\right)} m \right\rceil,$$

where $Long_{Rx}$ and $Long_{Tx}$ are the longitudes of the locations of the receiver and broadcaster, respectively, and $Lat_{Rx}$ and $Lat_{Tx}$ are the corresponding latitudes. The expression $\lceil x \rceil$ denotes the ceiling of x, which is the smallest integer larger than or equal to x. If i is larger than m, then the index is m.

Figure 4C:
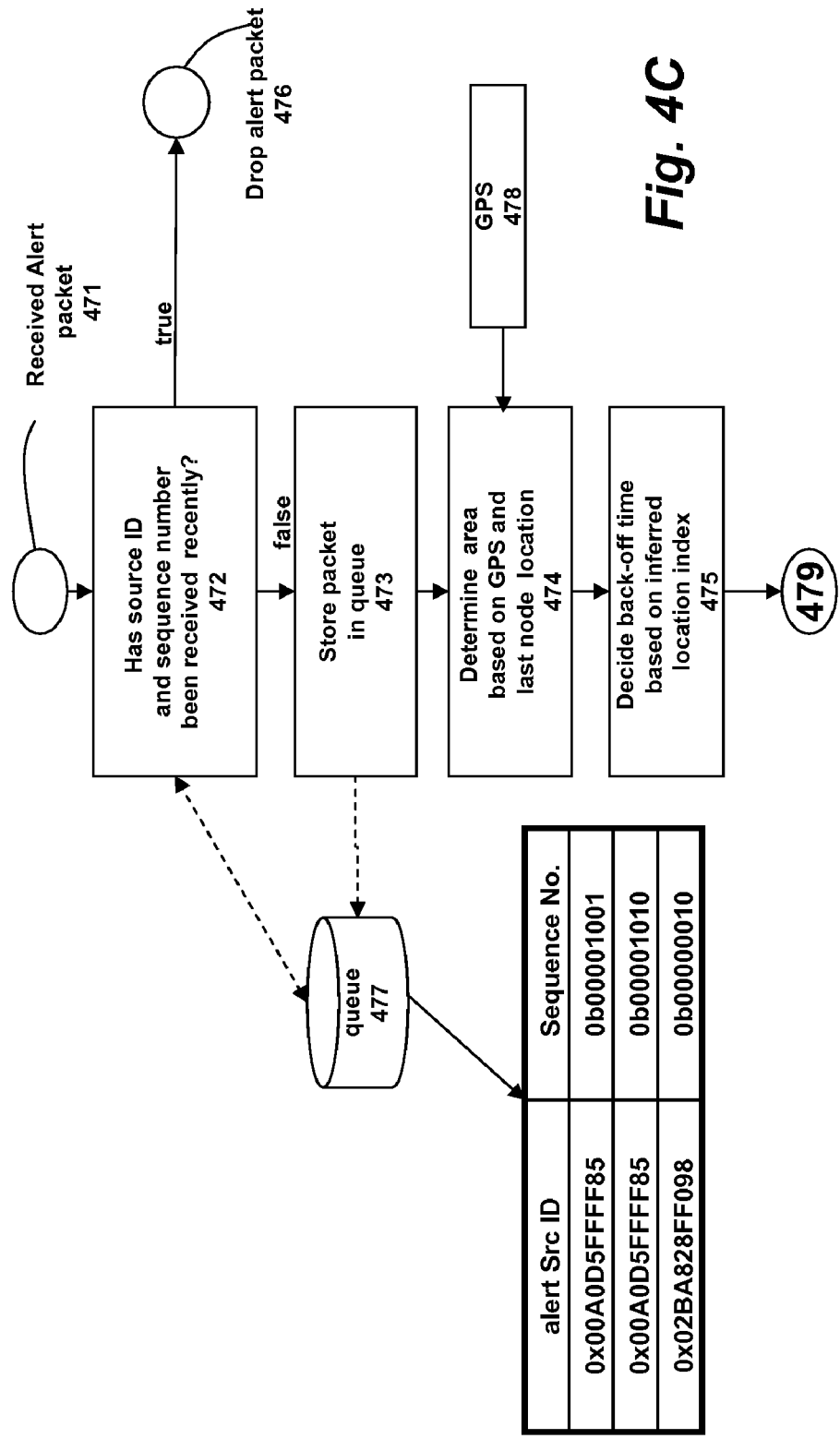
FIG. 4C is a flow diagram of a decision process after receiving an alert packet.

FIG. 4C shows the processing of a received alert packet 471 using the GPS 478. The receiving node determines 472 if the node ID and sequence number have recently been received. If true, the packet is dropped 476. If false, the node stores 473 the packet in a packet queue 477. Each entry in the queue eventually expires, and is removed from after some pre-determined time. The node determines 474 the area using the GPS 478 and last node location, and select 475 back-off value accordingly, and proceed 479 as shown in FIG. 3.

Method Based on RSSI

Figure 5A:
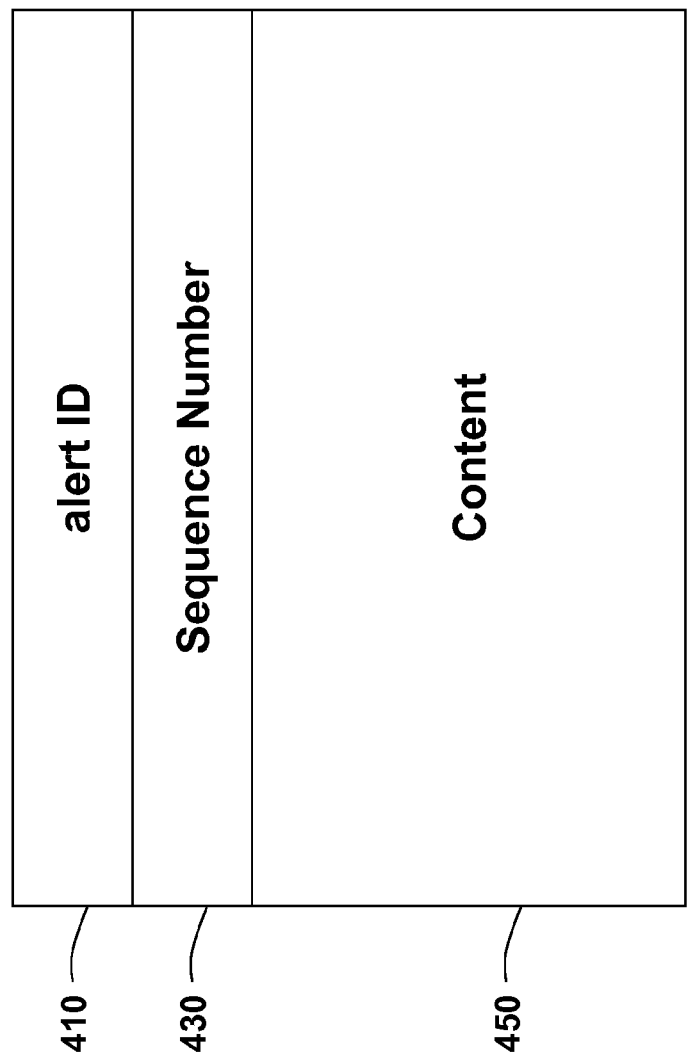
FIG. 5A is an example of alert packet structure that supports broadcast contention control using RSSI.

FIG. 5A shows the alert packet 500 if the RSSI is used. The source ID can be a 48-bit medium access control (MAC) address. The sequence number distinguishes different alert packets by the same source. The content pertains to the alert.

Figure 5B:
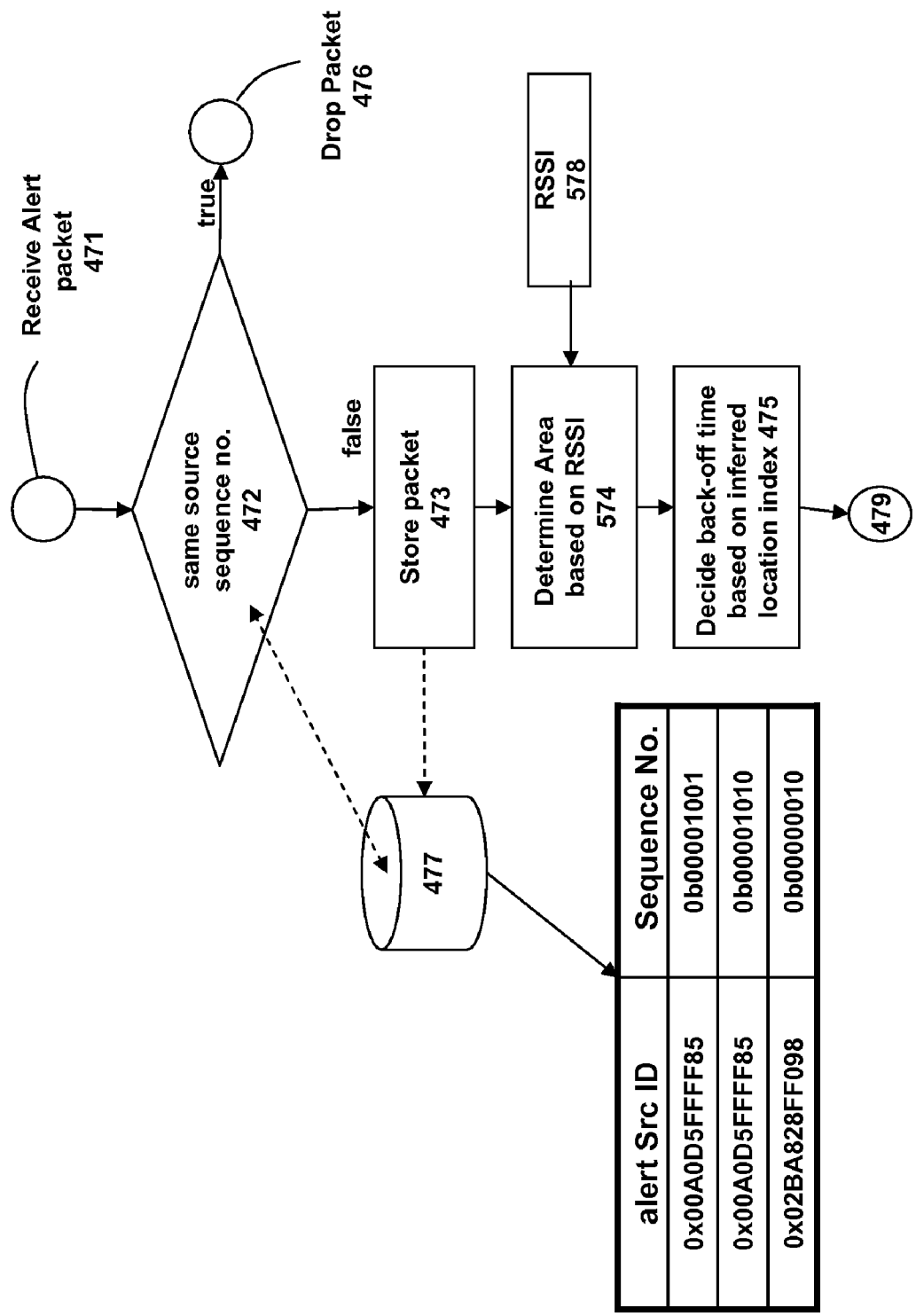
FIG. 5B is a decision routine for processing a received alert packet when RSSI is used.

FIG. 5B shows the method based on the RSSI 578. For a broadcast power $P_{Tx}$ (in dBm), receiver sensitivity $RSSI_{th}$ (in dBm), and locations have m areas, the node determines the index to the inferred location, i, based on the RSSI value, r (in dBm), using $$i = \left\lceil \frac{POW\left(\frac{P_{Tx} - r}{10\alpha}\right) - 1}{POW\left(\frac{P_{Tx} - RSSI_{th}}{10\alpha}\right) - 1} m \right\rceil, \text{ for } RSSI_{th} \leq r \leq P_{Tx},$$

where $POW(x)=10^x$. For $r \geq P_{Tx}$, set i=1; and for $r \leq RSSI_{th}$, set i=m if the packet is decoded successfully.

Figure 6:
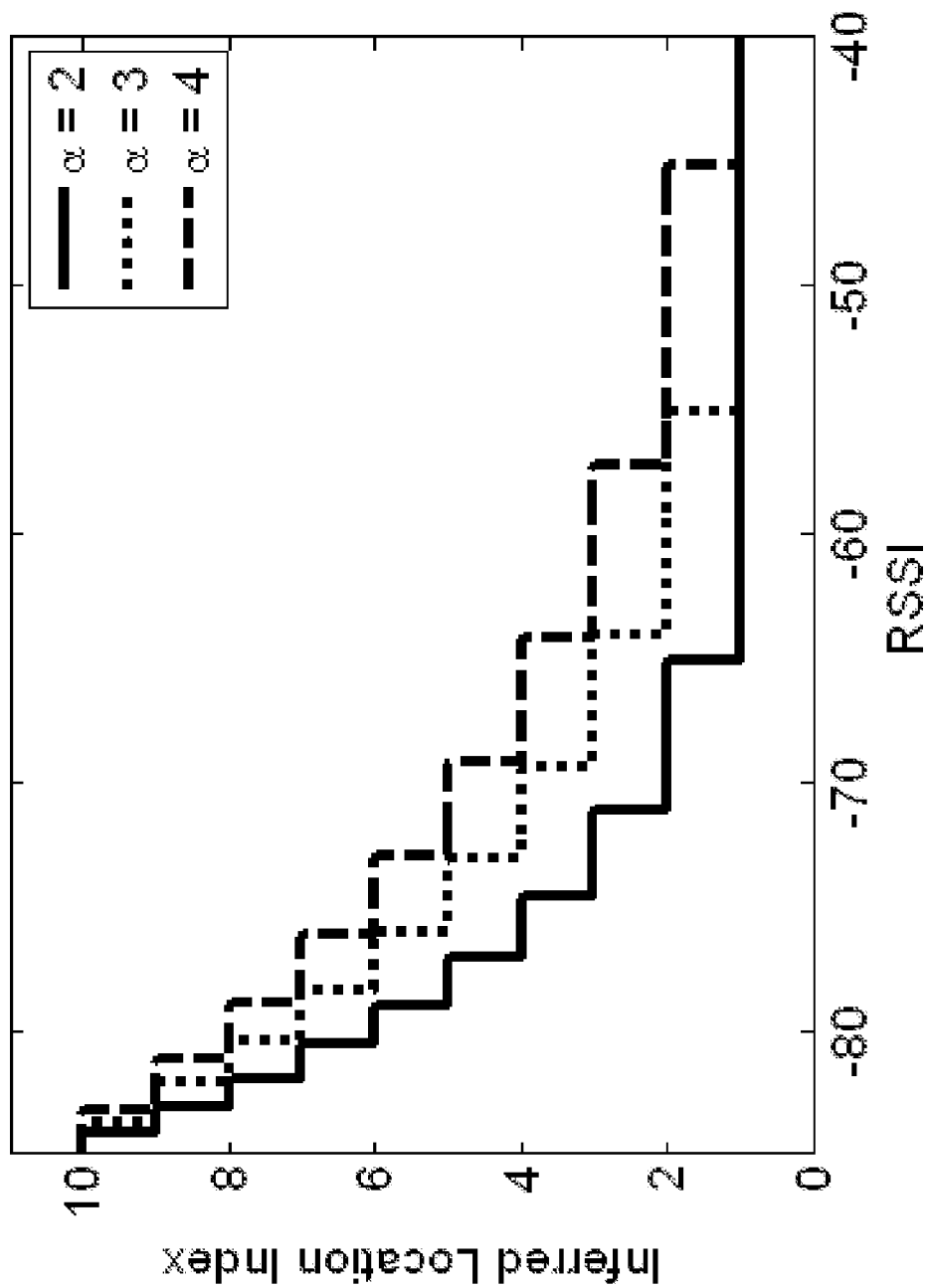
FIG. 6 is a graph of inferred location index as a function of RSSI for different path loss exponent a, assuming the minimum receiver sensitivity is −85 dBm, and maximum broadcast power is 33 dBm.

FIG. 6 shows the relationship between the inferred location index and the RSSI value, assuming m=10, $RSSI_{th}$=−85 dBm and $P_{tx}$=33 dBm. When $P_{Tx}$ is much larger than $RSSI_{th}$, which is valid in most wireless communication systems, the above expression can be simplified to $$i = \left\lceil POW\left(\frac{RSSI_{th} - r}{10\alpha}\right) m \right\rceil,$$

which is independent of the transmit broadcast power. After the inferred location is decided, the node selects the back-off value using the method described in the next section.

Probability of Selecting a Back-Off Value Based on the Inferred Location

As shown in FIG. 7, the node selects the back-off value based on a probability matrix after the inferred area is determined. The probability matrix shows, for each inferred location index i, the probability $p_{ij}$ of selecting a specific back-off time $b_j$.

Assuming that the nodes are uniformly distributed in a geographical area, the following condition are met in order to minimize collision due to multiple simultaneous broadcasts from different nodes upon receiving the same alert packet $$\sum_{i=1}^{m} p_{ij} = \frac{m}{n}, \text{ for all } j \in \{1, 2, \ldots, n\},$$

where n represents the number of back-off values. There are many ways to ensure that the condition for minimal collision is satisfied. For example, as specified in the IEEE 802.11 standard, a uniform back-off where $p_{ij}$=1/n for all values of i and j, satisfy this condition.

However, the current standard does not provide priority to any node. In fact, any uniform distribution satisfying the condition above leads to the same probability of packet collision. In our method, to extend a range of the rebroadcasting, we use non-uniform distribution with the following criteria:

$$\sum_{j=1}^{k} p_{aj} \geq \sum_{j=1}^{k} p_{bj} \text{ for all } k \in \{1, 2, \ldots, n\} \text{ and } a > b.$$

Following are example functions that can be used in the probability matrix.

EXAMPLE 1

$p_{ij}=2*\{[(p_2-p_1)/(n-1)][((n-2*j+1)*(i-1)+(m-1)*n)/(m-1)]+(n*p_1-p_2)/(n-1)\}/[n*(p_1+p_2)]$, where $p_1$ and $p_2$ are positive parameters selected such that $p_1 \leq p_2$. The different selections of $p_1$ and $p_2$ provide different distributions. For example, $p_1=p_2$ gives a uniform distribution.

EXAMPLE 2

Set the probability using the following procedure:

---

For i = 1 to m
    For j = n to 1 with step of -1

$$p_{ij} = \min\left\{\frac{m}{n} - \sum_{k=1}^{i-1} p_{kj}, 1 - \sum_{k=j-1}^{n} p_{ik}\right\}$$

(Note The first summation is not used if i = 1,
    and the second summation is not used if j = n.)
    end
end

---

As an example, this procedure yields the following probability matrix when n=4:

$$P_{1\times 4} = \begin{bmatrix} \frac{1}{4} & \frac{1}{4} & \frac{1}{4} & \frac{1}{4} \end{bmatrix}, P_{2\times 4} = \begin{bmatrix} 0 & 0 & \frac{1}{2} & \frac{1}{2} \\ \frac{1}{2} & \frac{1}{2} & 0 & 0 \end{bmatrix},$$

$$P_{3\times 4} = \begin{bmatrix} 0 & 0 & \frac{1}{4} & \frac{3}{4} \\ 0 & \frac{1}{2} & \frac{1}{2} & 0 \\ \frac{3}{4} & \frac{1}{4} & 0 & 0 \end{bmatrix}, P_{4\times 4} = \begin{bmatrix} 0 & 0 & 0 & 1 \\ 0 & 0 & 1 & 0 \\ 0 & 1 & 0 & 0 \\ 1 & 0 & 0 & 0 \end{bmatrix}, P_{5\times 4} = \begin{bmatrix} 0 & 0 & 0 & 1 \\ 0 & 0 & \frac{4}{5} & \frac{1}{5} \\ 0 & \frac{1}{2} & \frac{1}{2} & 0 \\ \frac{1}{5} & \frac{4}{5} & 0 & 0 \\ 1 & 0 & 0 & 0 \end{bmatrix},$$

$$P_{6\times 4} = \begin{bmatrix} 0 & 0 & 0 & 1 \\ 0 & 0 & \frac{1}{2} & \frac{1}{2} \\ 0 & 0 & 1 & 0 \\ 0 & 1 & 0 & 0 \\ \frac{1}{2} & \frac{1}{2} & 0 & 0 \\ 1 & 0 & 0 & 0 \end{bmatrix}, P_{7\times 4} = \begin{bmatrix} 0 & 0 & 0 & 1 \\ 0 & 0 & \frac{1}{4} & \frac{3}{4} \\ 0 & 0 & 1 & 0 \\ 0 & \frac{1}{2} & \frac{1}{2} & 0 \\ 0 & 1 & 0 & 0 \\ \frac{3}{4} & \frac{1}{4} & 0 & 0 \\ 1 & 0 & 0 & 0 \end{bmatrix}, P_{8\times 4} = \begin{bmatrix} 0 & 0 & 0 & 1 \\ 0 & 0 & 0 & 1 \\ 0 & 0 & 1 & 0 \\ 0 & 0 & 1 & 0 \\ 0 & 1 & 0 & 0 \\ 0 & 1 & 0 & 0 \\ 1 & 0 & 0 & 0 \\ 1 & 0 & 0 & 0 \end{bmatrix}.$$

The method used in the second example minimizes the probability of packet collision, and maximizes the probability that a vehicle further away from the alert source rebroadcasts an alert message first.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for broadcasting an alert packet in a wireless multi-hop network of nodes, comprising:
    sensing an event in a source node of the network;
    broadcasting an alert packet in response to sensing the event;
    receiving the alert packet in a set of candidate nodes within a broadcast range of the source node;
    inferring, in each candidate node, a distance between the candidate node and the source node based on a receive power of the received alert packet;
    determining, in each candidate node, a priority for rebroadcasting the alert packet, wherein the priority is based on the distance to minimizing a probability of collisions while rebroadcasting the alert packet and extend a range of the rebroadcasting; and
    determining back-off times for rebroadcasting packets for the set of the candidate nodes based on the priority of each candidate node and a back-off probability distribution, wherein the back-off probability distribution is a non-uniform distribution among the nodes with the same priority, such that a cumulative probability for the nodes increases with the distance from the source node.

2. The method of claim 1, wherein the distance is determined by a global positioning system or any other mechanisms at the node.

3. The method of claim 1, wherein the distance is dependent of a transmit power of the broadcasting.

4. The method of claim 1, wherein the distance is independent of a transmit power of the broadcasting.

5. The method of claim 1, wherein the priority is used to determine a back-off time before the rebroadcasting, and wherein a high priority has a short back-off time, and a low priority has a long back-off time.

6. The method of claim 5, further comprising:
    sensing, in each candidate node, whether a channel for the rebroadcasting is free before the back-off time expires; and
    rebroadcasting only if the channel is free.

7. The method of claim 1, wherein the priority is selected from a non-uniform probability distribution function, which assigns a higher priority to the candidate nodes farther away from the source node, while at the same time minimizes the probability of collisions.

8. The method of claim 1, wherein the alert packet s rebroadcast only if the alert packet has not been previously received.

9. The method of claim 1, wherein the alert packet includes an identification of the source node, a sequence number, and content related to the event.

10. The method of claim 9, wherein the alert packet further includes a location of a last node rebroadcasting the alert packet.

11. The method of claim 5, further comprising:
    decrementing the back-off time until a predetermined time expires;
    sensing a channel for the rebroadcasting while decrementing; and suspending the decrementing while other nodes are broadcasting.

12. The method of claim 11, further comprising:
resuming the decrementing after the channel becomes free.

13. The method of claim 1, wherein the priority is independent on a maximum distance of the broadcasting.

14. The method of claim 11, further comprising:
discarding the alert packet while suspending.

15. The method of claim 9, wherein the identification of source node and sequence number is stored by each candidate node.

16. The method of claim 10, wherein the identification expires after a predetermined time interval.

17. The method of claim 5, wherein the alert packet includes an identification of the source node, a sequence number, and content related to the event, and further comprising:
decrementing the back-off time until a predetermined time expires;
sensing a channel for the rebroadcasting while decrementing;
suspending the decrementing while other nodes are broadcasting; and
discarding the alert packet based on the identity and the sequence number while suspending.

18. The method of claim 17, further comprising:
decoding the received alert packet while suspending.

19. A system for broadcasting an alert packet in a wireless multi-hop network of nodes, comprising:
a source node configured to sense an event and to broadcast an alert packet in response to sensing the event; and
a set of candidate nodes, wherein each candidate node is configured to receive the alert packet when within a broadcast range of the source node, and
wherein each candidate node further comprises:
means for inferring a distance between the candidate node and the source node based on a receive power of the received alert packet; and
means for determining a priority for rebroadcasting the alert packet, wherein the priority is based on the distance to minimizing a probability of collisions while rebroadcasting the alert packet and extend a range of the rebroadcasting; and
means for determining back-off times for rebroadcasting packets for the set of the candidate nodes based on the priority of each candidate node and a back-off probability distribution, wherein the back-off probability distribution is a non-uniform distribution among the nodes with the same priority, such that a cumulative probability for the nodes increases with the distance from the source node.

20. The method of claim 1, wherein the determining back-off times comprises:
determining a probability matrix satisfying a criteria $$\sum_{j=1}^{k} p_{aj} \geq \sum_{j=1}^{k} p_{bj} \text{ for all } k \in \{1, 2, \ldots, n\} \text{ and } a > b,$$

wherein n represents a number of back-off values, P is a probability of back-off time, and a, b are the priorities represented by a location index i, wherein the probability matrix shows, for each location index, the probability $p_{ij}$ of selecting a specific back-off time.

* * * * *